United States Patent [19]

Wright

[11] Patent Number: 4,464,858
[45] Date of Patent: Aug. 14, 1984

[54] CURRENT CORK

[76] Inventor: Bill R. Wright, 2008 Nebraska Ave., Muskogee, Okla. 74401

[21] Appl. No.: 380,088

[22] Filed: May 20, 1982

[51] Int. Cl.³ ............................................. A01K 91/00
[52] U.S. Cl. .................................................. 43/43.13
[58] Field of Search .................. 43/43.13, 42.49, 42.45

[56] References Cited

U.S. PATENT DOCUMENTS

| | | | |
|---|---|---|---|
| 1,361,602 | 12/1920 | Marks | 43/43.13 |
| 2,273,209 | 2/1942 | Louthan | 43/43.13 |
| 2,594,673 | 4/1952 | Nichols | 43/42.49 |
| 2,726,475 | 12/1955 | Wiselka | 43/43.13 |
| 2,798,331 | 7/1957 | Westdahl | 43/43.13 |
| 2,924,907 | 2/1960 | Hamilton | 43/43.13 |
| 3,135,065 | 6/1964 | Cromoga | 43/42.49 |
| 3,140,555 | 7/1964 | Gross | 43/43.13 |
| 3,229,407 | 1/1966 | Quyle | 43/42.5 |
| 3,229,408 | 1/1966 | Kohfield | 43/43.13 |
| 3,464,142 | 9/1969 | Hubbart | 43/43.13 |
| 3,543,431 | 12/1970 | Olds | 43/43.13 |
| 3,747,248 | 7/1973 | Baer | 43/43.13 |

Primary Examiner—Gene P. Crosby
Attorney, Agent, or Firm—Head, Johnson & Stevenson

[57] ABSTRACT

A multipurpose fishing device having a single elongated essentially flat planing or hydrofoil surface with a first eyelet rigidly suspended on one side above the longitudinal axis of the surface and displaced away from the surface and at least one additional eyelet at or near the trailing edge of the surface. Such a device can be employed as a conventional fishing bobber or cork, fishing lure, and/or water kite in a variety of types of recreational fishing including trolling, bank or ice fishing and rod and reel casting. The device is particularly useful in that it combines the features of bait casting with the concept of a water kite, thus allowing the angler to readily work the entire surface of a river or stream from the bank or shore.

8 Claims, 14 Drawing Figures

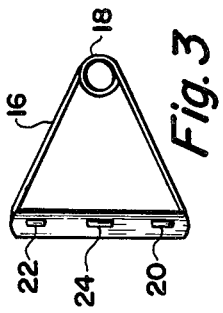
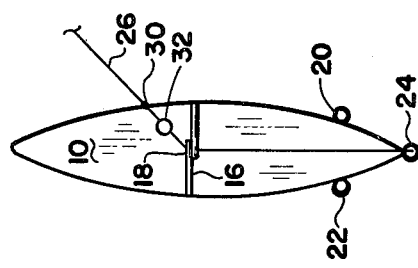
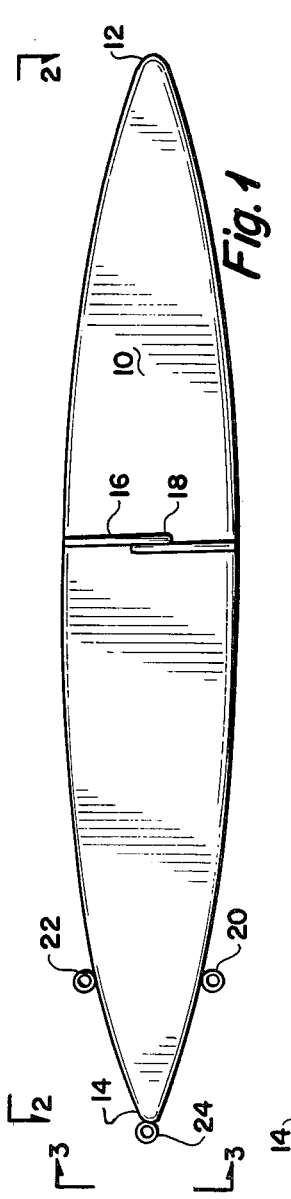
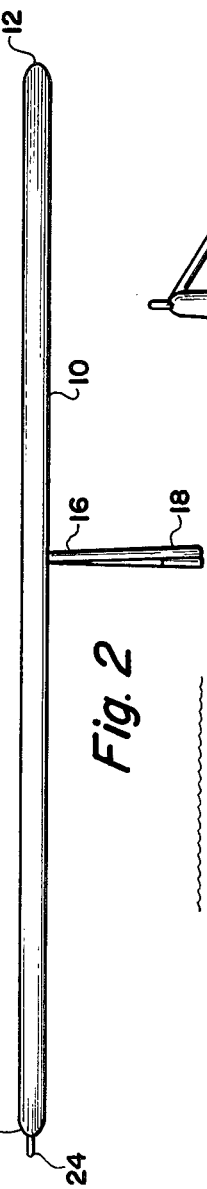
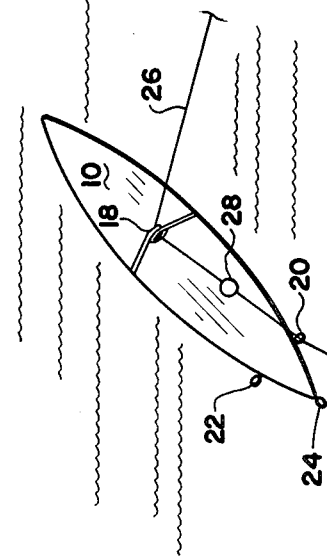
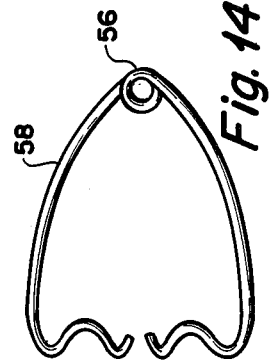

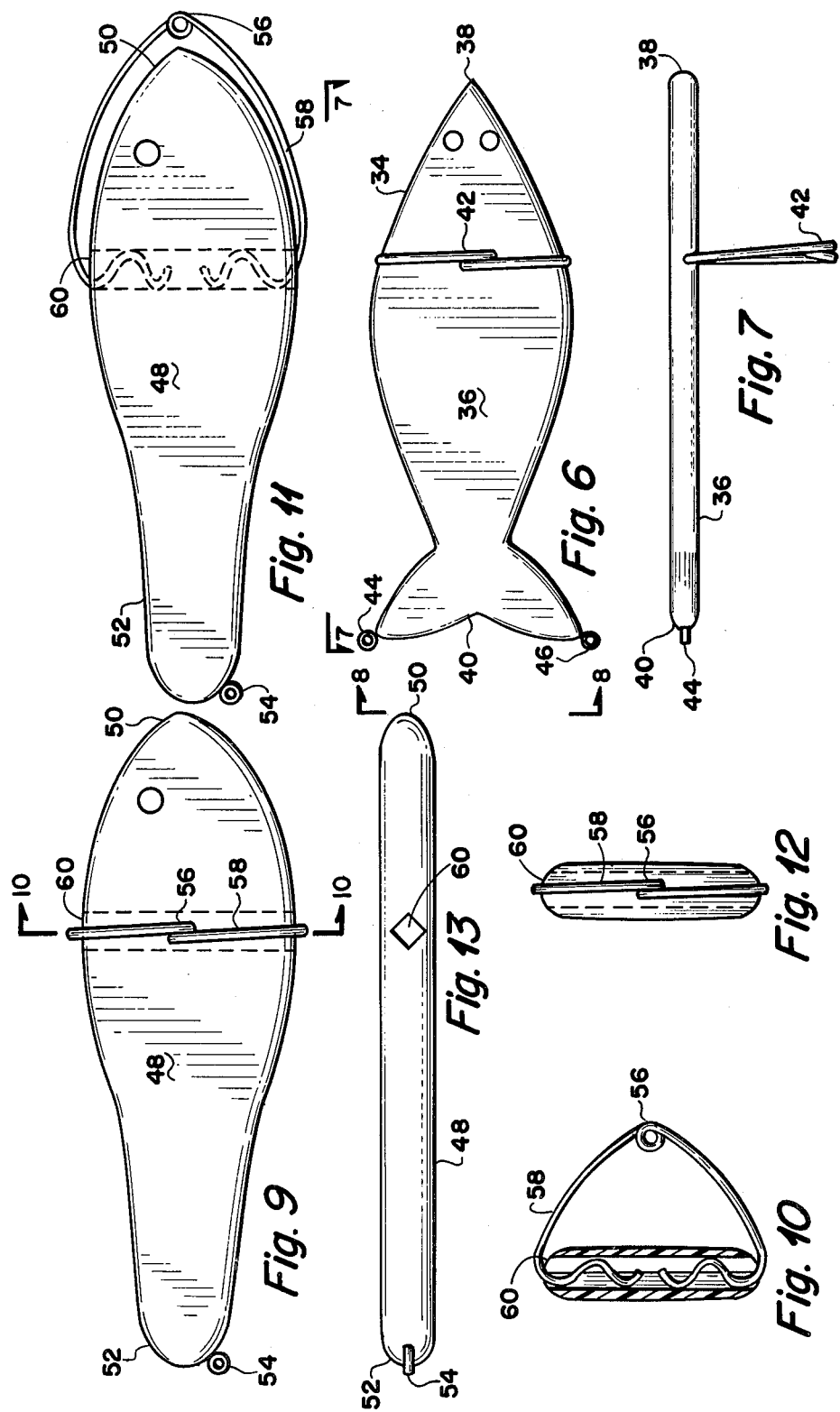

CURRENT CORK

BACKGROUND OF THE INVENTION

1. Field of the Invention

This invention relates to fishing tackle. More specifically, the invention relates to a multipurpose fishing cork or bobber.

2. Description of the Prior Art

The art of fishing, whether viewed in terms of an occupation or as recreation, dates back to some of man's earliest recorded history. Consequently, a vast variety of methods and devices for catching fish appears in the literature. Similarly, the contemporary recreational angler with rod and reel has a varierty of fishing tackle to choose from, including many types of hooks, lines, sinkers, floats, artificial lures and the like, each having specific applications in certain siutations and conditions. However, many problem areas still remain with essentially no acceptable or ideal solution.

For example, when fishing with light casting equipment from the bank or shore of a flowing river, stream or the like, it would be desirable to be able to work the entire river or stream in a manner analogous to trolling. Yet no relatively inexpensive and convenient, yet reliable fishing tackle compatible with conventional casting equipment and the like is available to accomplish such a task.

In the past, various devices have been proposed to overcome this problem, but each has been less than satisfactory and consequently, has met with limited success. For example, nearly a century ago the concept of employing a miniature boat with a wind driven sail from which a line and hook can be attached appeared in U.S. Pat. No. 270,358. This basic concept has been extended and refined in U.S. Pat. Nos. 1,361,602 and 3,747,248, yet obviously such a suggestion has limited applications particularly on a windless day. The basic concept of employing the current or direction of water movement of assist the angler in directing a lure or bait to a desired location has been suggested. Thus, various types of water kites can be found in the patent literature. In U.S. Pat. Nos. 2,924,907 and 3,140,555 a water kite for trolling is disclosed, while in U.S. Pat. Nos. 2,273,209 and 2,726,475, a fishing kite for deep submergence is disclosed. U.S. Pat. Nos. 2,798,331 and 3,464,142 disclose a buoyant device. However, none of the water kites is sufficiently simple and small enough to be compatible with bait casting techniques. This point is rather obvious in that all of the devices mentioned above involve fixing the fishing line permanently to the water kite. This will inherently restrict the acceptable distance between the water kite and hook when casting (i.e., the length of the line with hook that is attached to the device is severely restricted).

SUMMARY OF THE INVENTION

In view of the limitations associated with the prior art devices, I have discovered an improved multipurpose fishing device comprising:

(a) a single elongated essentially flat surface characterized in that the longitudinal axis extending from the leading end to the trailing end of the surface is substantially greater than the maximum width of the surface and wherein the surface is intended to act as a planing surface for hydrofoil during operation;

(b) a first eyelet means between the leading end and the trailing end, wherein the eyelet means is operatively attached and rigidly positioned at a fixed distance away from one side of the flat surface and essentially above the longitudinal axis; and (c) at least one second eyelet means near the trailing end of the surface and operatively attached to the surface essentially in the plane of the surface and displaced to one side of the longitudinal axis.

The present invention further provides for a third eyelet to be attached near the trailing end of the surface on the other side of the longitudinal axis and a fourth eyelet to be attached at the trailing end. Optionally, the first eyelet can be pivotally attached to the surface such that it can be reversibly rotated from a fixed position on one side to a fixed position on the other side or to the leading end.

It is a primary object of the present invention to provide a simple and inexpensive current cork that is multifunctional in that it can perform simultaneously as a conventional bobber and as a water kite. It is a further object that the current cork or water kite be compatible with light rod and reel casting techniques as well as trolling or other types of recreational fishing. Fulfillment of these objects and the presence and fulfillment of other objects will be apparent upon a complete reading of the specification and claims when taken in conjunction with the attached drawing.

BRIEF DESCRIPTION OF THE DRAWINGS

FIG. 1 is a side view of the multipurpose fishing device according to the present invention.

FIG. 2 is a top view of the device of FIG. 1 as seen through line 2—2.

FIG. 3 is a rear elevational view of the device of FIG. 1 as seen through the line 3—3.

FIG. 4 illustrates the fishing device of FIG. 1 when used as a current cork.

FIG. 5 illustrates the fishing device of FIG. 1 when used as a slip cork.

FIG. 6 is a side view of an alternate embodiment of the fishing device according to the present invention.

FIG. 7 is a top view of the device of FIG. 6 as seen through line 7—7.

FIG. 8 is a rear elevational view of the device of FIG. 6 as seen through line 8—8.

FIG. 9 is a side view of another alternate embodiment of the fishing device according to the present invention.

FIG. 10 is a cross sectional view of the fishing device of FIG. 9 as seen through line 10—10.

FIG. 11 is a side view of the fishing device of FIG. 9 with the eyelet attachment means rotated to the front of the device.

FIG. 12 is a front view of the device of FIG. 11.

FIG. 13 is a top view of the device of FIGS. 9 and 10 less the attachment eyelet means.

FIG. 14 is a side view of the attachment eyelet means of FIGS. 9 and 10.

DESCRIPTION OF THE PREFERRED EMBODIMENTS

The multipurpose fishing device according to the present invention, how it is used, and how it functions can best be explained and understood by reference to the accompanying drawings. FIG. 1 illustrates a general purpose embodiment of the present invention. As illustrated, the fishing device involves a single elongated, essentially flat surface 10 having a leading or front end designated as 12 and a trailing or rear end designated as 14. The longitudinal axis (dashed line) extending from the leading end 12 to the trailing end 14 is significantly greater than the maximum width (again dashed line) of the surface.

As can be seen in FIGS. 2 and 3, the essentially flat surface 10 has a relatively narrow or thin profile from the top and rear respectively. Protruding from one side and approximately midway between the front and the rear ends, 12 and 14, is a rigid looped wire 16 forming an eyelet 18 suspended above the longitudinal axis and physically displaced away from the side. To the rear of the surface 10 and attached to the edge of the surface 10 is a second eyelet 20 and a third eyelet 22, each attached near the trailing end 14 above and below the longitudinal axis respectively. A fourth eyelet 24 is attached at the trailing end 14 of the surface 10 essentially on the longitudinal axis.

To use the fishing device of FIG. 1 as a current cork, the fishing line 26 (as shown in FIG. 4) is threaded through the first eyelet 18 and then through the second eyelet 20. A hook with bait, artificial lure or the like is then attached to the end of the line. In operation and as illustrated in FIG. 4, the fact that the lower rearward eyelet 20 is off-center and the front eyelet 18 is rigidly affixed to one side of the surface 10 results in surface 10 acting as a planing surface or hydrofoil at an angle approaching perpendicular to the direction of the line from the fisherman with the leading tip of the surface 10 extending upward. As a result of this configuration, the device will inherently tend to fly (with the plane of the flat surface being essentially vertical) and assume a position out in front of the fisherman. In other words, when used as a current cork, the flow of the water in a river or stream will propel the device in a kite-like manner relative to the fisherman on the river bank such that the fishing line and device will be at a downstream angle approaching 45° or even greater When the fisherman slowly lets out the line, the current cork will propel itself as far out into the river as the fisherman desires and further than anyone can cast bait in the conventional manner. By selectively controlling the rate and duration of letting out and retrieving of line and the tension on the line, essentially any arbitrary downstream portion of the river can be fished from a fixed location on the bank. In explaining this behavior, it should be appreciated that the attitude and angle of attack taken by the hydrofoil surface in the current during operation is in part determined and controlled by the angler and this feature of the invention is achieved by the novel arrangement and position of the eyelets to the hydrofoil surface.

In order to use the current cork concept from the other bank or when the current is flowing from the other direction, the fishing line is merely threaded through the third eyelet 22 rather than eyelet 20. Also, as illustrated in FIG. 4, a split shot can be conveniently attached to the line between eyelets 18 and 20 (or 22). This is particularly useful if a predetermined depth of fishing (length of line between eyelet 20 and hook or lure) is known or desired. Several variations of the general concept can also be advantageously employed. For example, a slidable bead or the like can be placed between the eyelet (instead of the split shot) and knots or small pieces of rubber band and the like can be tied above, below, or both above and below the respective eyelet to give additional control over the depth of fishing. The sliding bead with knot or the like can also be advantageously employed to allow the fishing device to slide to a position very close to the lure or bait when the line is in a reeled in position for casting. Yet, the device after casting will allow the bait to assume the desired depth. Various alternative arrangements as well known in the art can also be employed for similar purposes, such as split shot on either or both sides of the eyelets.

In FIG. 5, the fishing line is threaded through eyelet 18 and then through the end eyelet 24. In this configuration the fishing device becomes a slip cork. By tying a knot 30 in the line and placing a slip bead 32 between the knot 30 and the front eyelet 18, the length of line extending from the cork to the hook is predetermined. Again, such a configuration is totally compatible with light bait casting techniques. Upon casting the device into the water, the bait will sink to the desired depth and stop because of the inability of the knot 30 to pass through bead 32 and the bead 32 to pass through the eyelet 18.

By using this slip cork configuration in a river with current, the bait can be propelled out into the river. Although the angle of flight (the angle of attack) is not optimum as in the previous current cork configuration, significant hydrofoil effect is induced by the tension of line 26. Upon reaching the desired position in the river, the line is let out and the bait sinks to the desired depth. The device then floats downstream as a conventional bobber or float. When the line is tightened, the bait will rise and the device flies back upstream where the cycle can begin again. Also, in this slip cork configuration, the fishing device readily permits jigging of a jig without necessitating movement by the fisherman, a feature that is useful in still fishing, ice fishing and the like.

The general purpose embodiment of the present invention as illustrated in FIGS. 1 through 5, can be readily made or manufactured out of any conventional material commonly used in the art including by way of example, but not limited thereto, wood, plastic, lightweight or hollow metal and combinations thereof. The eyelet means and the support member (wire 16 in the figures) can be any equivalent structure well known in the art that permits a fishing line to pass therethrough and be held rigidly at the appropriate position. Although up to this point, the description of the function of the device has been limited to a buoyant type structure and to fishing from the bank or shoreline, alternative embodiments of the invention that are nonfloating, denser than water are contemplated as are both surface and subsurface trolling or bait casting versions.

In FIG. 6 a flat fish lure designed embodiment 34 is pictured. Again, the device is essentially an elongated flat surface 36 in the shape of a fish with the longitudinal axis running from the mouth 38 to the tail 40. A rigidly suspended eyelet 42 (see FIGS. 7 and 8) is attached to one side of the fish surface 36 and positioned essentially above the longitudinal axis. At the tip of each tail fin is an eyelet, 44 and 46 respectively, which functions in a manner analogous to the previous current cork description. Clearly missing from this embodiment is the fourth eyelet located at the tail along the longitudinal axis. As such, the device is not as versatile as the previous general purpose embodiment in that it will not function as a slip cork or conventional cork. However, such an embodiment is particularly useful as a submersible or semi-submersible current lure. This embodiment is also envisioned as being inexpensive to manufacture in that it can be readily stamped from sheet metal or plastic. The device of FIG. 6 can be advantageously employed during trolling or bait casting. Although the flat lure will not float, it will remain at or near the surface when in flight. As generally known, by controlling the trolling speed or the like, the lure can be made to submerge and perform underwater and at higher speeds it will perform at the surface. As in the case of the previously described current cork, the fish designed lure will hydrofoil or plane (fly) to one side or the other, depending on which tail fin eyelet 44 or 46 is being used. As such the bait on the end of the line will be directed to either side of the boat and out of the wake and disturbance created by the boat and motor.

FIGS. 9 through 14 illustrate still another embodiment of the present invention viewed as being particularly useful in top water bait casting and trolling. Again, the flat surface 48 is designed to resemble a fish with a head 50 at one end and tail 52 at the other. At the tail end 52 s a single eyelet 54 corresponding to the lower eyelet of the other embodiments. The multidirectional capability is achieved by providing the device with a rotatable eyelet 56 and pivoting eyelet support member 58. As shown in FIG. 14, the eyelet support member 58 and eyelet 56 are formed out of a single continuous bent wire. When the wire is inserted into the square cross section hole 60 penetrating from the top to the bottom of the flat surface 48 across the width of the surface, the eyelet and support member can pivot from one side to the other and be held rigidly in the corners of the square hole 60. The support member 58 can also be reversibly pivoted to a position coplanar with surface 48 such that the eyelet 56 is held directly in front of the head of the fish. In this configuration the fishing device can be used as a conventional artificial lure or plug. Preferably this embodiment is to be fabricated out of material less dense than water and weighted such that the eyelet 54 is directed downward during use. Since the embodiment floats, it is particularly useful for trolling along shorelines and the like wherein the fishing device can be used to pull bait through very shallow water around the bank where fish often gather, but water is too shallow for conventional trolling.

The present invention offers numerous advantages over the prior art devices. In addition to the ability to hydroplane across the current away from the fisherman and still retain the ability to cast by conventional bait casting techniques, the current cork is designed to perform a variety of functions. The device is highly visible, as well as highly sensitive, in that a fish striking the bait can both be seen in the response of the cork and felt by the angler. The current cork also rides up and down over the waves creating a desirable vertical motion to artificial lures as well as producing a swimming motion to the bait. Furthermore, the fisherman need not hold the rod and reel at all times, for the current cork will perform automatically when the rod is placed in a rod holder. When a strike occurs, the current cork will automatically fly upward tending to hook the fish. The same inherent upward and outward motion will tend to wear down the fish and tend to keep it off the bottom or away from the bank. And, the current cork can be used with either artificial baits as well as live bait. Thus, the above in combination with the previously discussed trolling, casting and still fishing features make the current cork a multifunctional highly versatile piece of fishing tackle.

Having thus described the invention with a certain degree of particularity, it is manifest that many changes can be made in the details of construction, design and arrangement of components without departing from the spirit and scope of this disclosure. Therefore, it is to be understood the invention is not limited to the embodiments set forth here for purposes of exemplification, but is to be limited only by the scope of the attached claims, including a full range of equivalents to which each element thereof is entitled.

I claim:

1. A multipurpose fishing device comprising:
   (a) a single elongated essentially flat surface characterized in that the longitudinal axis extending from the leading end to the trailing end of said surface is substantially greater than the maximum width of the surface and wherein said surface is intended to act as a vertical planing surface or vertical hydrofoil during operation;
   (b) a first wire eyelet means between said leading end and trailing end, wherein said first wire eyelet means is operatively attached transversely to said longitudinal axis of said single elongated essentially flat surface by the wire of said wire eyelet means and rigidly positioned at a fixed distance away from one side of said flat surface and essentially above said longitudinal axis; and
   (c) at least one second eyelet means near the trailing end of said surface and operatively attached to said surface essentially in the plane of said surface and displaced to one side of said longitudinal axis for suspending said fishing device in cooperation with said first wire eyelet means 2. A multipurpose fishing device of claim 1 further comprising a third eyelet means near the trailing end of said surface and operatively attached to said surface essentially in the plane of said surface and displaced to the other side of said longitudinal axis.

3. A multipurpose fishing device of claim 2 further comprising a fourth eyelet means at the trailing end of said surface and operatively attached to said surface essentially in the plane of the surface and along said longitudinal axis.

4. A multipurpose fishing device of claim 1, 2 or 3 wherein said device is buoyant.

5. A multipurpose fishing device of claim 1, 2 or 3 wherein said device is denser than water.

6. A multipurpose fishing device comprising:
   (a) a single elongated essentially flat surface characterized in that the longitudinal axis extending from the leading end to the trailing end of said surface is substantially greater than the maxumum width of the surface and wherein said surface is intended to act as a planing surface or hydrofoil during operation;
   (b) a first eyelet means between said leading end and trailing end, wherein said first eyelet means is pivotally attached to said surface and rigidly positioned at a fixed distance away from one side of said flat surface and essentially above said longitudinal axis and wherein said first eyelet means can be reversibly rotated from said fixed position away from one side of said surface to the leading end or to a fixed position away from the other side of said surface; and
   (c) at least one second eyelet means near the trailing end of said surface and operatively attached to said surface essentially in the plane of said surface and displaced to one side of said longitudinal axis for suspending said fishing device in cooperation with said first wire eyelet means.

7. A multipurpose fishing device of claim 6 further comprising a third eyelet means near the trailing end of said surface and operatively attached to said surface essentially in the plane of said surface and displaced to the other side of said longitudinal axis.

8. A multipurpose fishing device of claim 7 further comprising a fourth eyelet means at the trailing end of said surface and operatively attached to said surface essentially in the plane of the surface and along said longitudinal axis.

* * * * *